United States Patent
Danysh (10) Patent No.: US 12,516,489 B2
(45) Date of Patent: Jan. 6, 2026

(54) POLYMERIC WATERPROOFING MEMBRANE

(71) Applicant: Agru/America, Inc., Georgetown, SC (US)

(72) Inventor: Matthew Danysh, Pawleys Island, SC (US)

(73) Assignee: Agru/America, Inc., Georgetown, SC (US)

( * ) Notice: Subject to any disclaimer, the term of this patent is extended or adjusted under 35 U.S.C. 154(b) by 301 days.

(21) Appl. No.: 18/252,913

(22) PCT Filed: Nov. 15, 2021

(86) PCT No.: PCT/US2021/059352
§ 371 (c)(1),
(2) Date: May 15, 2023

(87) PCT Pub. No.: WO2022/104191
PCT Pub. Date: May 19, 2022

(65) Prior Publication Data
US 2023/0417010 A1    Dec. 28, 2023

Related U.S. Application Data (60) Provisional application No. 63/114,140, filed on Nov. 16, 2020.

(51) Int. Cl.
*E02D 31/00* (2006.01)
*B29C 48/00* (2019.01)
*B29L 7/00* (2006.01)

(52) U.S. Cl.
CPC ........ *E02D 31/004* (2013.01); *B29C 48/0011* (2019.02); *B29L 2007/00* (2013.01)

(58) Field of Classification Search
CPC ....... E02D 17/20; E02D 31/00; E02D 31/002; E02D 31/004; B29C 48/0011; B29L 2007/00
See application file for complete search history.

(56) References Cited

U.S. PATENT DOCUMENTS 5,258,217 A * 11/1993 Lewis ..................... B32B 5/024
428/167
5,891,549 A *  4/1999 Beretta ................... B29C 48/08
428/101

(Continued)

FOREIGN PATENT DOCUMENTS

| CN | 201047082 | 4/2008 |
| CN | 102912782 | 2/2013 |
| CN | 104060633 | 8/2016 |

OTHER PUBLICATIONS

Wang et al.; Machine Translation CN102912782 A; All; Feb. 2013 (Year: 2013).*

*Primary Examiner* — Benjamin F Fiorello
(74) *Attorney, Agent, or Firm* — Offit Kurman; Douglas L. Lineberry (57) ABSTRACT

Described herein are systems and methods for forming an improved Drainliner Max with improved load bearing capability in the range of 500-15,000 or 23 to 720 kPA via improved stud placement and improved height/diameter dimensions to provide a much improved product that vastly outperforms existing systems.

15 Claims, 4 Drawing Sheets

(56) References Cited

U.S. PATENT DOCUMENTS

| | | | | |
|---|---|---|---|---|
| 6,194,049 B1* | 2/2001 | Bindschedler-Galli | ............ | B32B 27/36 |
| | | | | 52/409 |
| 2004/0131423 A1* | 7/2004 | Ianniello | ............ | E01C 3/00 |
| | | | | 405/36 |
| 2008/0069642 A1* | 3/2008 | Ayers | ............ | B09B 1/004 |
| | | | | 405/129.45 |
| 2010/0233427 A1* | 9/2010 | De Giuseppe | ............ | B32B 7/05 |
| | | | | 428/119 |
| 2010/0272516 A1* | 10/2010 | Ayers | ............ | B09B 1/004 |
| | | | | 405/129.9 |
| 2012/0230777 A1* | 9/2012 | Ayers | ............ | E02B 3/126 |
| | | | | 405/302.7 |
| 2014/0170339 A1* | 6/2014 | Ayers | ............ | E02D 17/20 |
| | | | | 428/17 |
| 2014/0270992 A1* | 9/2014 | Ayers | ............ | E02B 3/121 |
| | | | | 428/17 |

* cited by examiner

FIGURE 1

TABLE 1 Hydraulic Transmissivity Results

| | | |
|---|---|---|
| New DrainLiner IDS | $2.5 \times 10^{-3}$ | $m^2/sec$ |
| Old Product | $4.0 \times 10^{-4}$ | $m^2/sec$ |

Based on Conditions of 10,000psf, 0.1 Gradient, and 15 minute seat time

POLYMERIC WATERPROOFING MEMBRANE

TECHNICAL FIELD

Since the 1991 amendment to the Resource Conservation and Recovery Act (RCRA), federal law requires that solid waste and hazardous waste landfills be protected from the environment. This requires the landfill to have a base liner with a leachate collection system and a closure cap liner with a cover system that prevents rain water from filtering to the underlying waste. Originally both the leachate collection and rainwater runoff systems were built to be a blended system of geomembrane liners with geocomposite drainage media. A combination of a geomembrane with a drainage structure in one product was introduced around 10 years ago. This product was used in limited applications because the drainage flow characteristic was very poor. The product had very widely spaced protrusion that were too short and the spacing was too far between the protrusions to be a good drainage media.

After rigorous testing and evaluation the current disclosure provides a better product with six times the flow capability as previous products. The subject matter disclosed herein is generally directed to systems and methods for forming an improved geomembrane, Agru America's DRAINLINER IDS, with improved flow for load capability and a bearing load range of 23 kPA to 720 kPa or 15,000 pounds per square foot via improved stud placement and improved stud height/diameter dimensions to provide a much-improved product that vastly outperforms existing systems.

BACKGROUND

For ten plus years the DRAINLINER products have been on the market for landfill, mining, and coal ash geomembrane applications. These products are made on a flat die extrusion line with calendaring rollers that carry the reverse shape of the drain stud. The product is then placed into a system with either a geotextile or other geomembrane placed atop the studs.

This sandwiched product then allows water, leachate, or other streams to flow through the product. These existing products, however, are limited to a light load bearing systems (<5.00 psf or 23 kPa) because of the limited load carrying ability of the stud placement.

The designs of the present disclosure provide a density of from 4000-6000 studs per meter squared. Prior products with these low density of studs (4000-6000) had too much distance between the studs which allowed the adjoining geotextile, composites, or other geomembranes to be pressed in between the studs reducing the flow area. Also prior products had stud heights of only 2.5-4.5 mm heights, which also prevented a higher amount of flow. The measure of the products flow ability is tested in accordance to ASTM D4715 Hydraulic Transmissivity. However, increased flow rate and load carrying capability are needed in the industry. Accordingly, it is an object of the present disclosure to provide for an improved design, which allows for load carrying capabilities of between 500-15,000 psf or 23-720 kPa and flow rates greater than $2.5 \times 10^{-3}$ m$^2$/sec.

Citation or identification of any document in this application is not an admission that such a document is available as prior art to the present disclosure.

SUMMARY

The above objectives are accomplished according to the present disclosure by providing in one embodiment, an improved geomembrane. The geomembrane may include a substrate, at least two studs on the substrate, a stud density defined on the substrate via placement of the at least two studs to provide a three-dimensional contour on the substrate, and the stud density allows the substrate to provide a support weight of 1,500 to 15,000 pounds per square foot or 23 to 720 kPa. Further, stud density may be from 8,000 to 12,000 studs per meter. Still further, the height of the at least two studs can range from 4 to 6 mm. Even further, the substrate may have a stud diameter of 2.5 mm to 4.0 mm. Still yet, the substrate may have a small root radius of 0.1 mm to 1.8 mm. Further again, the stud density may provide stud spacing of 6 mm to 12 mm in all of the row spacing, column spacing, and diagonal spacing dimensions between all studs on the substrate. Moreover, the support weight is changed via changing spacing between the at least two studs. Still yet, the support weight may change via changing spacing between studs in a flow direction with respect to orientation of the substrate.

In a further embodiment, a method is provided for forming an improved geomembrane. The method may include extruding a molten polymer onto a calendaring roller gap, pressing the molten polymer into at least two stud cavities defined on a roller, cooling the molten polymer to solidify the molten polymer into a substrate and to form at least one two studs on the substrate wherein the studs conform to a shape of the at least two stud cavities defined on the roller, defining a stud density on the substrate via placement of the at least two studs to provide a three-dimensional contour on the substrate, and forming the stud density so the substrate has a support weight of 1,500 to 15,000 pounds per square foot or 23 to 740 kPa. Further, the method may include forming the substrate onto a roll. Still, the stud density may be formed to provide 8,000 to 12,000 studs per meter. Yet again, the substrate may be formed where a height of the at least two studs to range from 4 to 6 mm. Still yet, the method may include forming the substrate to define a stud diameter of 2.5 mm to 4.0 mm. Moreover, the substrate may be formed to define a small root radius of 0.1 mm to 1.8 mm. Furthermore, the stud density may provide stud spacing of 6 mm to 12 mm in all of the row spacing, column spacing, and diagonal spacing dimensions between all studs on the substrate. Still the substrate may be formed to provide a support weight is changed via changing spacing between the at least two studs. Yet again, the method may provide changing the support weight via changing spacing between the at least two studs in a flow direction with respect to orientation of the substrate.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "weight percent," "%," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

The current disclosure provides moving the studs that populate a geomembrane closer together to allow for an increase in load carrying ability, such as from 10,000-15,000 psf or 23-720 kPa of the top layered product. This helps improve the product performance because at higher loads the opposing geotextile woven/unwoven or geomembrane is pressed into the intersectional flow space of the drain studs. This was not considered before because of the high expense of having a steel roller engraved with a new pattern, which could streamline the open flow passageway area. The ratio of the height of the stud to the effective stud diameter is critical because there will be horizontal shear force to withstand. Making the stud very large in diameter also has a detrimental affect by reducing the open flow passageway. The desired range of diameters of the stud could be 2.5-6 mm in diameter. The stud height, diameter, root radius, and stud spacing were studied and tested to determine the best flow under an increased load of 10,000-15,000 psf or 23-720 kPa load. The 23 kPa loading is used for cap applications for liners that are used to drain away rain water from the liner so it does not pool and cause potential loading and leakage into the cell. The 720 kPa would be for the bottom of the cell where the leachate could be drained, collected and removed from the cell bottom liner. Also the root radius was reduced in an effort to better streamline the flow passage.

Results

It was found that a range of 8,000 to 12,000 studs per meter squared provided good support for the load bearing 1,500-15,000 psf or 23-720 kPa. Also, a stud height range of 4-6 mm was found to be ideal for load conditions with a diameter range of 2.5 mm-4.0 mm with 3 mm being ideal. A small root radius of 0.1 mm to 1.8 mm is important factor with a 1.5 mm being ideal. The root radius is import because it eases the stress placed on the stud to a large area so as to minimize stress concentrations to the base liner. Stud spacing was most important with a separation distance of 6-12 mm in all directions. For the 15,000 psf or 720 kPa load condition the 8 mm spacing was ideal in the flow direction and 10 mm in the cross direction. For the 5,000 psf or load condition a spacing of 10 mm is ideal. For the cap application of 500 psf or 23 kPa load condition it was determined that the spacing should be 8 mm in the flow direction and the spacing be increased to 12 mm in the cross direction. These ranges were determined by the amount of geotextile that could be pressed into the gap with the amount of kPa loading.

The new design provided by the current disclosure outperforms former products by six (6) times at the same conditions by ASTM D4716. The design of the current disclosure has six (6) times more flow than the old products with the 5000 studs per meter.

Figure 1:
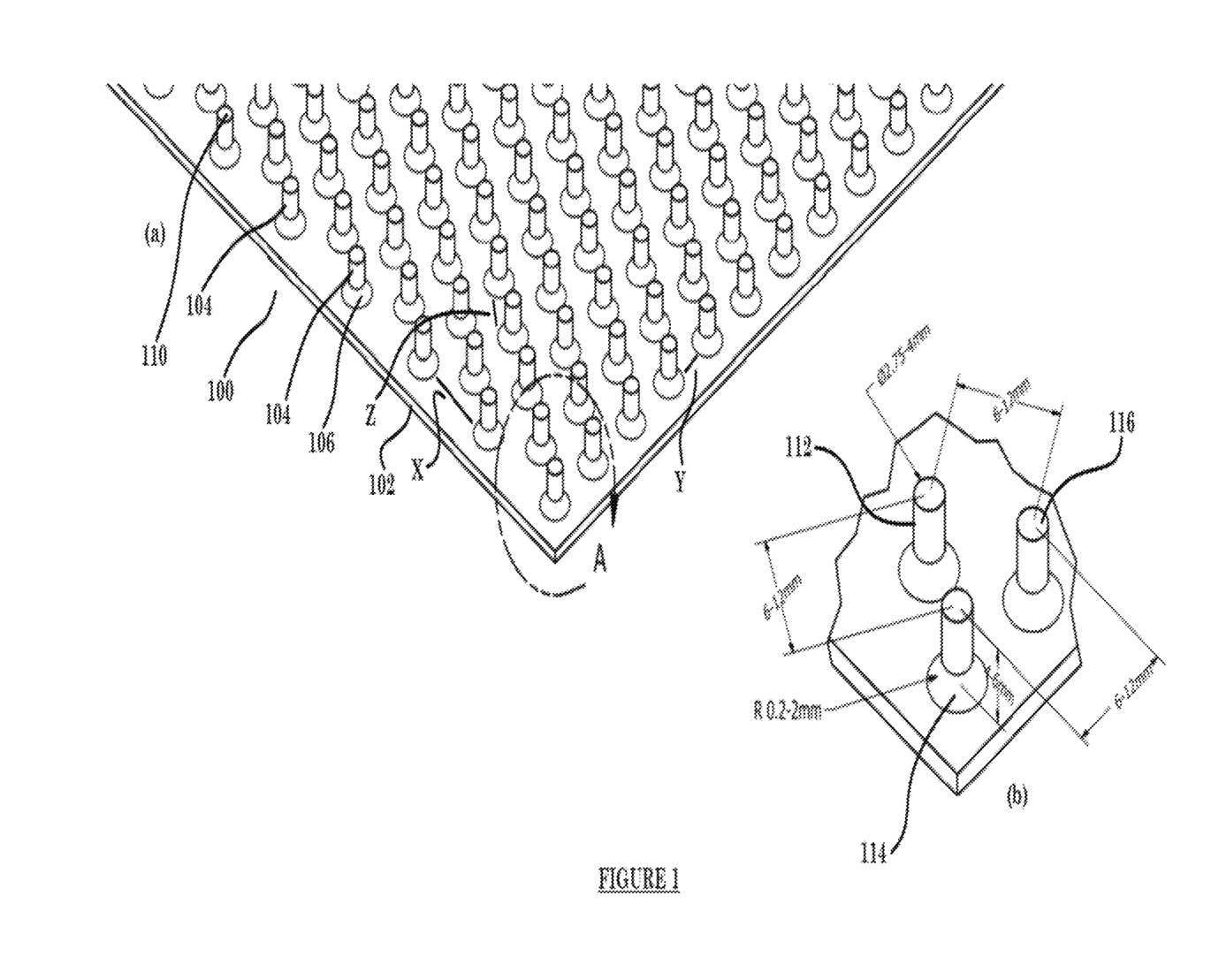
FIG. 1 shows an improved DRAINLINER MAX with improved stud dimensions and sample studs shown in standalone.

FIG. 1 shows an improved Drainliner Max with improved stud dimensions and sample studs shown in stand-alone.

Figure 2:
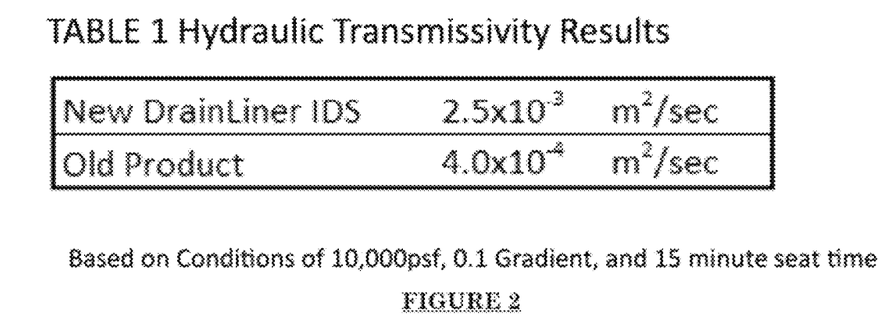
FIG. 2 shows Table 1, Hydraulic Transmissivity Results.

FIG. 2 shows Table 1, Hydraulic Transmissivity Results.

Figure 3:
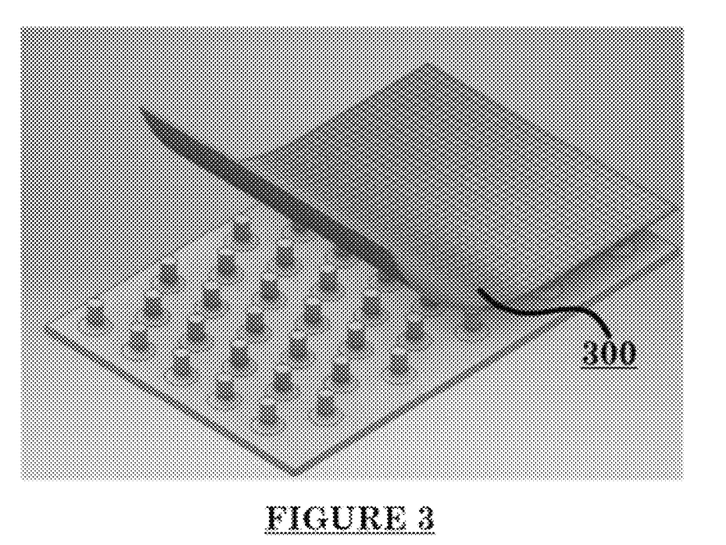
FIG. 3 shows an illustration of how other materials may be incorporated into the DRAINLINER MAX system of the current disclosure.

FIG. 3 shows an illustration of how other materials may be incorporated into the Drainliner Max system of the current disclosure. For instance, top layer 300 may be a smooth or textured geomembrane for a dual lined system. Top layer 300 may be a geotextile, geotextile blended into a nonwoven geotextile, or a plan woven geotextile to act as a filter structural layer. The top layer maybe a composite synthetic grass or artificial turf with or without a geotextile type backing. Top layer 300 can be a geocomposite material composed of a nonwoven or woven geotextile with a geonet material laminated or unlamented.

Figure 4:
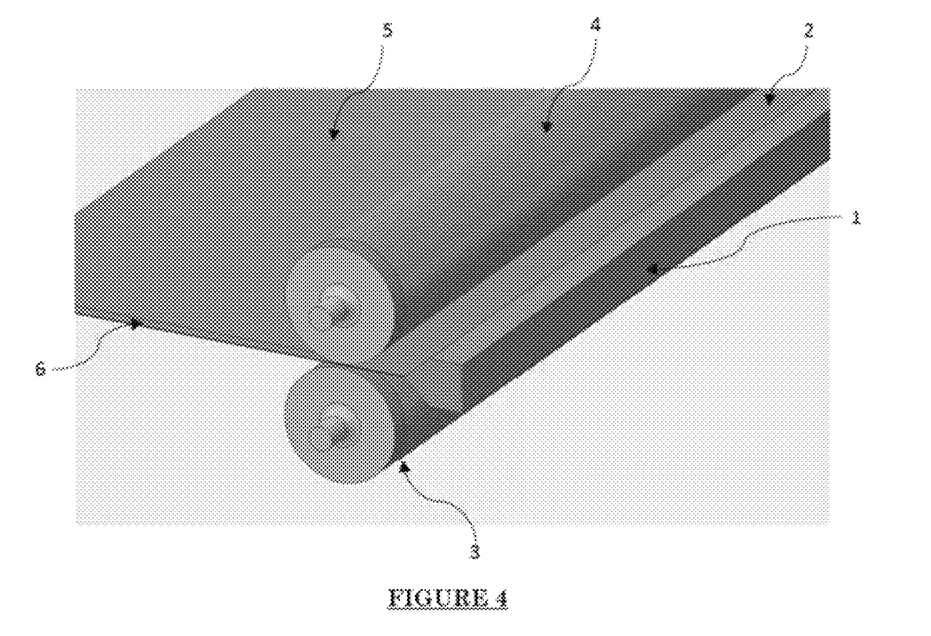
FIG. 4 shows one method of forming a geomembrane of the current disclosure.

FIG. 4 shows a polymer extrusion dye 1 that extrudes molten polymer 2 that passes through lower imprinted roller 3, which may form a Drainliner or Microspike or Friction or Smooth pattern. Upper imprinted roller 4 may form a Drainliner Max pattern. Finished embossed membrane 5 exits the rollers and has a smooth or protected edge 6, or a Drainliner, or a Drainliner Max, or Friction or Smooth pattern. The Drainliner would be the existing drain pattern with studs of 3000 to 6000 per square meter density. The friction liner is one that is designed to withstand relative motion and direct shear with the subbase. The friction liner can be of any type of conical or burr shaped extensions of 0.3 mm to 4 mm in height with varying heights and displacements. The smooth pattern is a roller with a fine finish as polished or with a sand blast finish resulting in a geomembrane that is relatively smooth with no spikes or extensions.

The Upper imprinted roller 4 may form a Drainliner Max pattern. Finished embossed membrane 5 exits the rollers and has a smooth or protected edge 6 or can be made with the Drainliner Max pattern to the edge. The smooth edge is desirable when installing one Drainliner Max sheet with an adjacent sheet. The two sheets maybe seamed together using a hot extrusion wedge fusion welding procedure with a lap over seam. With the studs removed from the sheet edge it is much easier to heat fuse the two smooth surfaces.

To form a geomembrane of the current disclosure, a molten low density, linear low density, medium density or high density polyethylene, raised temperature polyethylene PERT, or polypropylene is extruded by a flat die at temperatures 160-250° C. into the calendaring roller gap. The molten polymer is pressed into the stud cavities of the roller by the nip pressure created by the opposing top and bottom roller The roller, which is temperature controlled by a water with or without glycol coolant, or heat transfer oil, has a temperature from 65-110° C. Coolant running through the internal passages of the roller, cools the polymer, solidifying the stud shape into the geomembrane. The stud and geomembrane are then one in the same products and can be wrapped around the top roller for additional cooling and also wrapped around a 3rd and/or 4th and/or 5th and etc., roller(s) which can also provide additional cooling. The geomembrane then is pulled by a driven nip roller set to control the sheet takeoff rate and then wound together in a finished roll that can be deployed at the job site. This creates a structure so that leachate or run off can be contained, drained, and collected, With respect to FIG. 1 at (a), geomembrane 100 may have a substrate layer 102, which may be any suitable geotextile or other material that is able to be formed into geomembrane 100. Substrate layer 102 may be made from synthetic materials, such as polyester, polyethylene, or polypropylene, and may be a woven geotextile, non-woven geotextile, knitted geotextile, laid fabric, woven tape, or combinations of more than one type of material. Substrate layer 102 may be a co-extruded layered structure. Substrate 102 may be formed from any number of additional polymer thin films that may be made using known manufacturing techniques, and that may be provided as another layer. Using co-extrusion process, polymer layer may be provided with various benefits or attributes by controlling the type of polymer and additives present in each layer. Common types of polymers used in co-extruding flexible sheets include as polyethylene, polypropylene, and other polyolefins. Other polymers known to those skilled in the art may also be used, depending on the preferences of the user and the desired physical properties. In one example, substrate 102 may have has a thickness that is equal to or less than 0.006 inches. Geomembrane 100 may have a substrate layer 102, which may define any formed Drainliner, friction, or smooth pattern. The Drainliner is a liner with protrusions that can be either cylinders or truncated cones that act as a means to separate the base liner of the Drainliner from another geosynthetic material. This allows an air gap that then can be used to flow either run off, leachate, or gas under the Drainliner to a collection point. The Friction pattern can be made from an embossed roller that has inverted small spikes 0.3 mm to 2.5 mm in height with a density number of 10,000 to 500,000 per square meter that are arranged on the FIG. 4 roller 3. These inverted spikes are made by pressing a tool steel, carbide steel, or diamond, precious stone, or other hard tool material imprint wheel with the spikes into the roller 3, the spikes on the imprint wheel displaces the metal of the roller 3 and creates the inverted small spikes on the surface of the roller 3.

Substrate 102 may include stud 104. Stud 104 may include a column 106 and base 108 as well as column top 110. Substrate 102 also defines column spacing X between studs 104 in the same column as well as row spacing Y as well as diagonal spacing Z between the respective studs in separate columns, which are not adjacent or "side-by-side" to one another. FIG. 1 at (b) shows excerpt A, an enlarged portion of substrate 102, providing exemplary dimensions for studs 104, including column height 112, base width 114 and column top diameter 116. Stud 104 may be cylindrical, truncated cone shaped, or formed as a cylinder with sloping sides.

Various modifications and variations of the described methods and compositions will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. An improved geomembrane comprising: a substrate;
   at least three studs on the substrate, wherein the at least three studs include a dome-shaped base contacting the substrate and a column extending upward from the dome shaped base and away from the substrate, wherein a top of the column of the at least three studs is configured to contact a top layer positioned above the substrate;

wherein the at least three studs are configured in adjacent offset rows across a surface of the substrate;

a stud density defined on the substrate via placement of the at least three studs to provide a three-dimensional contour on the substrate wherein the stud density provides uniform stud spacing of 6 mm to 12 mm in all of the row spacing, column spacing, and diagonal spacing dimensions between all studs of the substrate to configure any group of three adjacent studs in a triangular relationship across the surface of the substrate; and wherein the stud density allows the substrate to provide a support weight of 1,500 to 15,000 pounds per square foot or 23 to 720 kPa.

2. The geomembrane of claim 1, wherein the stud density comprises 8,000 to 12,000 studs per meter squared.

3. The geomembrane of claim 1, wherein a height of the at least two studs ranges from 4 to 6 mm.

4. The geomembrane of claim 1, wherein the substrate has a stud diameter of 2.5 mm to 4.0 mm.

5. The geomembrane of claim 1, wherein the substrate has a small root radius of 0.1 mm to 1.8 mm.

6. The geomembrane of claim 1, wherein the support weight is changed via changing spacing between the at least three studs.

7. The geomembrane of claim 6, wherein the support weight is change via changing spacing between studs in a flow direction with respect to orientation of the substrate.

8. A method for forming an improved geomembrane comprising:

extruding a molten polymer onto a calendaring roller gap;

pressing the molten polymer into at least three stud cavities defined on a roller;

cooling the molten polymer to solidify the molten polymer into a substrate and to form at least three studs on the substrate wherein the studs conform to a shape of the at least three stud cavities defined on the roller wherein the at least three studs include a dome-shaped base contacting the substrate and a column extending upward from the dome shaped base and away from the substrate, wherein a top of the column of the at least three studs are configured to contact a top layer positioned above the substrate;

wherein the at least three studs are configured in adjacent offset rows across a surface of the substrate;

defining a stud density on the substrate via placement of the at least two studs to provide a three-dimensional contour on the substrate wherein the stud density provides uniform stud spacing of 6 mm to 12 mm in all of the row spacing, column spacing, and diagonal spacing dimensions between all studs of the substrate to configure any group of three adjacent studs in a triangular relationship across the surface of the substrate; and forming the stud density so the substrate has a support weight of 1,500 to 15,000 pounds per square foot or 23 to 720 kPa.

9. The method of claim 8, further comprising forming the substrate onto a roll.

10. The method of claim 8, further comprising forming the stud density to provide 8,000 to 12,000 studs per meter squared.

11. The method of claim 8, further comprising forming a height of the at least two studs to range from 4 to 6 mm.

12. The method of claim 8, further comprising forming the substrate to define a stud diameter of 2.5 mm to 4.0 mm.

13. The method of claim 8, further comprising forming the substrate to define a small root radius of 0.1 mm to 1.8 mm.

14. The method of claim 8, further comprising forming the substrate wherein the support weight is changed via changing spacing between the at least three studs.

15. The method of claim 14, further comprising changing the support weight via changing spacing between the at least three studs in a flow direction with respect to orientation of the substrate.

\* \* \* \* \*